United States Patent
Madern

(10) Patent No.: US 8,356,536 B2
(45) Date of Patent: Jan. 22, 2013

(54) INSTALLATION FOR MAKING A CUT, CREASE AND THE LIKE HAVING A PLATE-SHAPED FRAME

(76) Inventor: Jean Henry Robert Madern, Vlaardingen (NL)

(*) Notice: Subject to any disclaimer, the term of this patent is extended or adjusted under 35 U.S.C. 154(b) by 179 days.

(21) Appl. No.: 11/002,872

(22) Filed: Dec. 1, 2004

(65) Prior Publication Data
US 2005/0119099 A1 Jun. 2, 2005

(30) Foreign Application Priority Data

Jan. 12, 2003 (NL) .................................... 1024915

(51) Int. Cl.
*B23D 25/12* (2006.01)
(52) U.S. Cl. .......................................... 83/343; 83/344
(58) Field of Classification Search ................... 83/343, 83/344
See application file for complete search history.

(56) References Cited

U.S. PATENT DOCUMENTS

| | | | | |
|---|---|---|---|---|
| RE953 E * | 5/1860 | Brown et al. | | 83/343 |
| 168,011 A * | 9/1875 | Fry | | 83/344 |
| 2,881,835 A * | 4/1959 | Morgan | | 83/343 |
| 3,293,962 A * | 12/1966 | Gianaris | | 83/344 |
| 3,585,881 A * | 6/1971 | Sarka | | 76/107.1 |
| 4,341,525 A * | 7/1982 | Wittkopf | | 83/344 |
| 4,359,919 A * | 11/1982 | Fuchs et al. | | 83/344 |
| 4,553,461 A * | 11/1985 | Belongia | | 83/344 |
| 4,759,247 A * | 7/1988 | Bell et al. | | 83/344 |
| 4,770,078 A * | 9/1988 | Gautier | | 83/344 |
| 4,911,047 A * | 3/1990 | Hornung et al. | | 83/344 |
| 5,088,367 A * | 2/1992 | Cracchiolo et al. | | 83/343 |
| 5,138,923 A * | 8/1992 | Kent et al. | | 83/343 |
| 5,673,603 A * | 10/1997 | Aichele | | 83/344 |
| 5,826,481 A * | 10/1998 | Sintonen | | 83/343 |
| 6,244,148 B1 * | 6/2001 | Vees | | 83/344 |
| 6,370,998 B1 * | 4/2002 | Yokoro et al. | | 83/344 |
| 7,000,517 B1 * | 2/2006 | Spix et al. | | 83/343 |
| 2008/0023378 A1 * | 1/2008 | Madern et al. | | 209/559 |
| 2012/0006653 A1 * | 1/2012 | Madern | | 198/586 |

FOREIGN PATENT DOCUMENTS

| | | |
|---|---|---|
| EP | 0 610 650 B1 | 7/1998 |
| EP | 1537920 A1 * | 6/2005 |
| JP | 01040210 * | 2/1989 |
| WO | WO 9937576 A2 * | 7/1999 |
| WO | WO 2008013677 A2 * | 1/2008 |

* cited by examiner

*Primary Examiner* — Jason Daniel Prone
(74) *Attorney, Agent, or Firm* — Greenberg Traurig, LLP

(57) ABSTRACT

A rotary installation comprises a frame, a pair of rollers that define a pinch, a mount supporting the rollers on the frame, an adjuster for moving the mount and the rollers with respect to the frame as well as a drive for making the rollers rotate. The frame has an essentially flat shape determined by two main faces facing away from one another, on one of which main faces the rollers and mount are located.

28 Claims, 6 Drawing Sheets

INSTALLATION FOR MAKING A CUT, CREASE AND THE LIKE HAVING A PLATE-SHAPED FRAME

CROSS-REFERENCE TO RELATED APPLICATIONS

This application is a National Stage of Dutch Patent Application No. 1,024,915, filed Jan. 12, 2003, the contents of which are incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to an installation for making a cut, crease or relief and the like in a sheet of material, such as cardboard, comprising a frame, a pair of rollers that define a pinch between them and the roller surface of which has relatively high surface portions and relatively low surface portions, such as cutting edges and/or edges for making a crease in the sheet of material when feeding it through the pinch, mounting means for supporting the rollers on the frame, adjustment means for moving the mounting means and the rollers with respect to the frame as well as drive means for making the rollers rotate.

2. Description of Related Art Including Information Disclosure Statement Under 37 CFR 1.97 and 1.98

Such an installation is disclosed in EP-A 610 650. This known installation has a U-shaped frame with a horizontal base, with respect to which two arms are oriented upwards. These arms each have a slot that opens at the top. The cassettes in which the rollers are supported such that they can rotate are accommodated in these slots. The rollers can be removed from the frame after one another in the upward direction, the cassettes being slid in the slots.

BRIEF SUMMARY OF THE INVENTION

This known installation has various disadvantages that are associated with the fact that the rollers cannot be mounted in the frame in a simple manner. A cassette is fixed to each end of the rollers, which cassettes, in turn, have to be accommodated in the frame. Because said cassettes are at the ends of the rollers, the axial dimensions of the pair of rollers are relatively large. A further disadvantage is that the rollers first have to be assembled with the cassettes before they can be mounted in the frame.

A further disadvantage of the known installation is that, viewed in the direction of the slots, the rollers are behind one another. The bottom roller is fairly difficult to access, which is a disadvantage in operation. After all, it is located between the two upright arms and is furthermore also screened from above by the top roller. If the bottom roller is removed, the top roller always has to be removed first.

The aim of the invention is therefore to provide a rotary installation of the type described above that does not have these disadvantages. Said aim is achieved in that the frame has a support member that has a support side with respect to which the rollers are supported, which support side is parallel to the axis of the rollers and essentially extends the complete length of the rollers, leaving a slit free at the height of the pinch.

With the installation according to the invention both rollers are on one and the same side of an essentially flat frame. As a consequence of this arrangement, both rollers are easily accessible on that side thereof that faces away from the frame. The slit at the height of the pinch can be made as a slit-shaped passage for feeding through the material that is to be machined or has already been machined through the rollers.

The frame can be stiffened on the main face of the frame that faces away from the main face where the mounting means and the rollers are located. This stiffener can be columnar and preferably extends transversely to the longitudinal direction of the rollers.

The support member can be implemented in many different ways with a flat shape, such as a parallelepiped. One possible embodiment is a lattice with sufficiently stiff lattice joins. However, a frame in the form of a solid flat plate is preferred. Such a plate has appreciable stiffness in its own plane, which is extremely important for the stability of the rollers. As a supplementary feature, columnar stiffeners transverse to the rollers can optionally provide for stiffness with respect to bending of the plate. The support member can be made of a concrete. If the thickness is sufficiently great, the columnar stiffeners can be dispensed with.

According to a further alternative the support member can be double-walled. In this case the support member can also be hollow. Differing from this, the space in the support member between the walls can be filled with a filler, such as a hardened composite, densely packed particles and the like.

The frame can have parallel vertical guides, on which guides the mounting means are supported such that they can be moved. Each roller is mounted at the ends in a head, which head can be moved along a vertical guide by means of a respective linear actuator (mechanical or electronic). The size of the pinch can be adjusted as desired by means of these actuators.

Each head can have a rotary stab axle that interacts with one end of a roller. These stub axles are preferably connected to the rollers such that they can be detached. The advantage of such a detachable connection is that the heads can be permanently fixed to the frame. The rollers then do not all have to be provided with a head as standard. This is an important difference compared with the known installation, where the cassettes, which to a certain extent are equivalent to the heads because these cassettes also provide for mounting of the rollers, first have to be permanently fixed to the rollers and only then can be mounted in the frame. In the case of the installation according to the invention, a single set of heads that is permanently fixed to the frame and on which heads standard rollers can be mounted therefore suffices. As already mentioned, the rollers themselves are less voluminous. Moreover, the use of a single set of heads is less expensive because the material costs are lower, no stub axles have to be machined and the transport costs are also lower because of the smaller volume and lower weight.

As an example, the vertical guides can comprise two paws of guide rails, such that two heads located one above the other are supported on each pair of guide rails such that they can be moved.

According to a further embodiment, the frame can have parallel horizontal guides, with respect to which the mounting means are supported such that they can be moved. These vertical guides, in turn, are supported on the horizontal guides, which can comprise guide rails, such that they can be moved. It is possible that the vertical guides can be moved by means of linear actuators (mechanical or electronic).

The rollers can each be connected to their own electric drive motor such that they can be driven, which drive motors are connected to a control unit for synchronising the rotary motion thereof. With such an embodiment of the roller drive, synchronisation gears, such as are customary with the known cassette rollers, can be dispensed with.

According to one variant of the invention, a pair of uprights supported on the frame can be provided, each of which has a slot, bearing blocks on both ends of the rollers, which bearing blocks are accommodated in the slots in the uprights, the uprights being supported on the support side of the support member. Such uprights are known per se from EP-A 610 650 and conventionally are installed on a foundation. The frame made up in this way must be so rigid that the position of the rollers with respect to one another is guaranteed even under loading.

Two bearing blocks, which are located one above the other, are incorporated in each upright. The rollers can therefore be installed in the upright in the vertical direction and can also be removed therefrom again.

Good inherent rigidity of the frame can also be obtained with such a mounting of the rollers because the uprights are supported on the support side of the support member. These uprights are consequently supported in a very stable manner. To further increase the stability, the frame can have a base part on which the erected frame part is supported.

The support member preferably has guide backs on which the uprights are mounted such that they can be moved. The base of the frame can also have a guide track for supporting the uprights such that they can be moved.

In a known manner the bearing blocks can each have an external contour that is slideably accommodated in the associated slot with a tight fit. These hearing blocks can be constructed in various ways. According to the conventional method, each end of the rollers is provided with a fixed bearing block. When the rollers are changed the complete bearing blocks then also have to be changed as well. The rollers each form a unit with the associated bearing blocks, which is associated with high investment costs when keeping many different rollers, each for different products, in stock.

According to another, preferred embodiment, the bearing blocks can therefore each have a stub axle that is accommodated in a corresponding recess in the end face of a roller. A single set of four bearing blocks is then sufficient for mounting a large number of different rollers, all of which then are only provided with stub axles.

Reference is made to the printing device as disclosed in DE-A 199 37 796. This printing device has four rollers or more, which are mounted on a column at one or both ends by means of mountings at this location. The rollers protrude with respect to the column or columns, such that space is available immediately next to the rollers for the wetting units and printing units customary with a printing process. As a consequence of said free space, the frame is in the form of a framework consisting of two columns and two cross-members linking the columns to one another.

However, the frame of the installation according to the invention has a disc that essentially extends over the complete length of the rollers. Such a disc, which is interrupted only at the location of the slit-like passage, has an appreciably higher rigidity than a framework. Not only the flexural rigidity, but in particular also the shear rigidity of the frame can consequently be greater, which has a beneficial effect on the stability of the rollers.

A father advantage of the installation according to the invention is that the roller length can be matched to the width of the cardboard sheet to be machined. Usually the roller length is matched to the maximum width of cardboard. With the installation according to the invention, shorter rollers can be used in the case of relatively narrow cardboard sheets. These are then more rigid than relatively long rollers, which is beneficial for the result of the rolling operation.

BRIEF DESCRIPTION OF THE SEVERAL VIEWS OF THE DRAWINGS

The invention will be explained in more detail below with reference to an illustrative embodiment of the rotary installation shown in the figures.

DETAILED DESCRIPTION OF THE INVENTION

Figure 1:
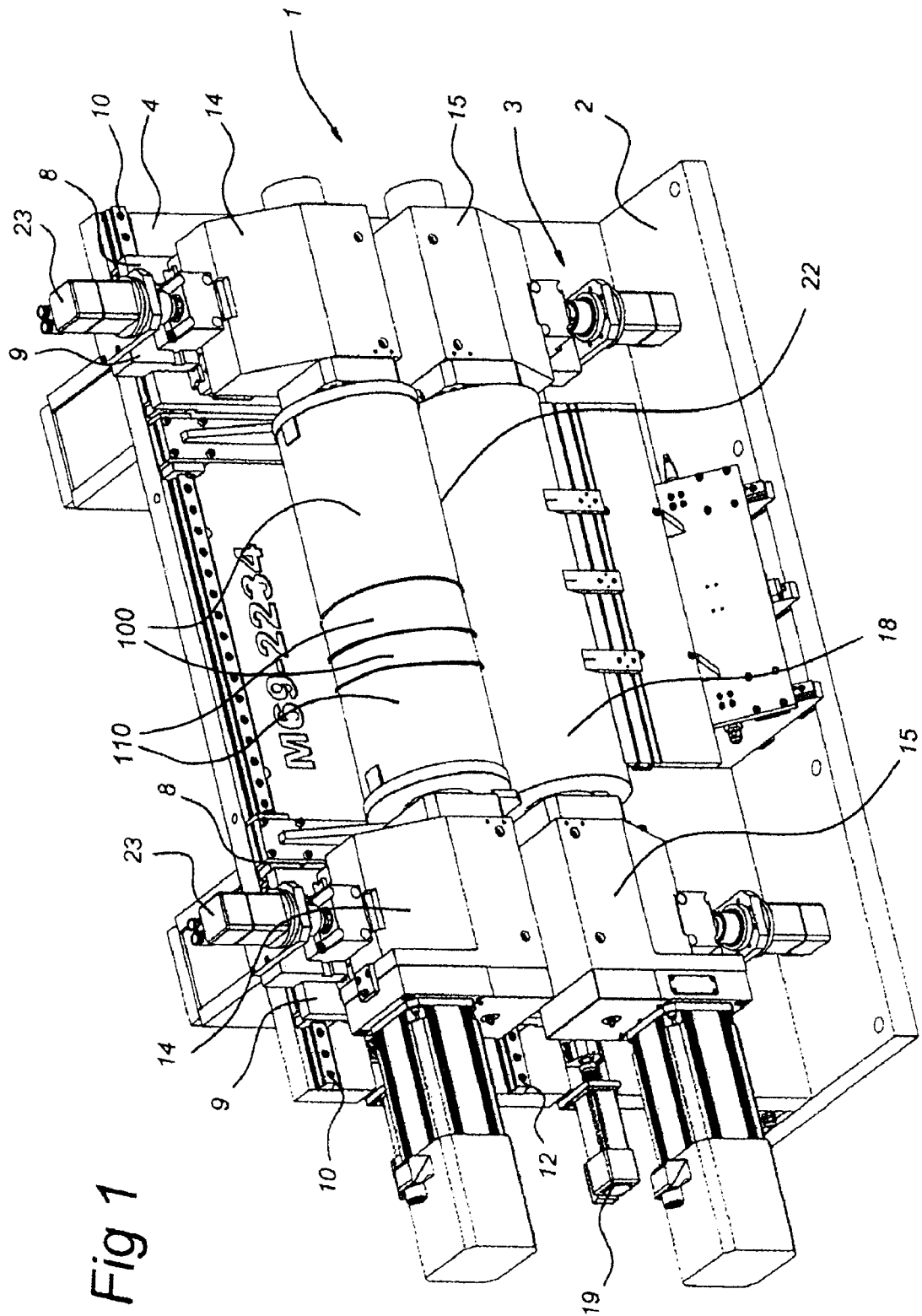
FIG. 1 shows a first perspective view of an installation according to the invention.
Figure 2:
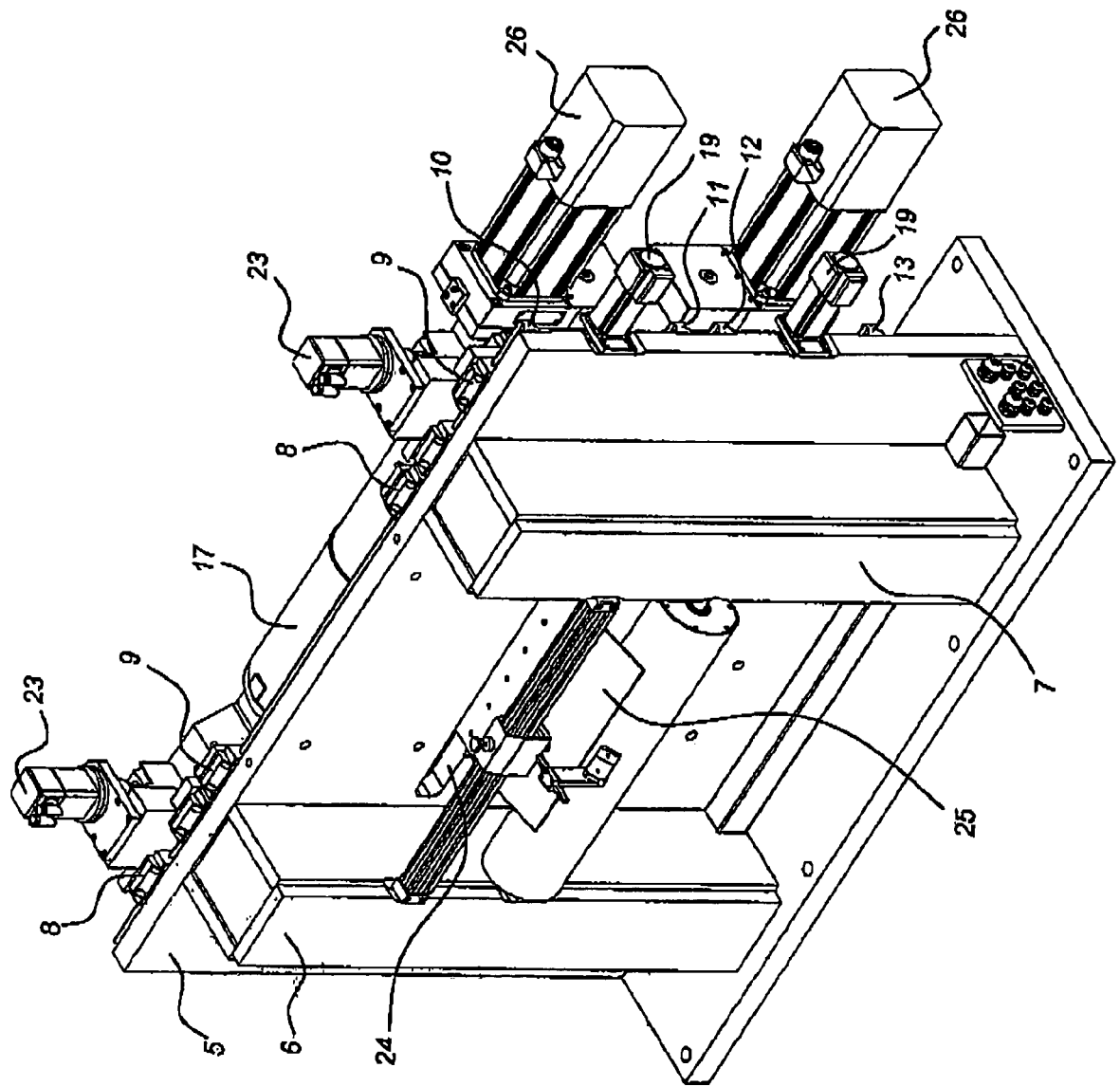
FIG. 2 shows a second perspective view.

The rotary installation shown in FIGS. 1 to 4 has a frame that is indicated in its entirety by 1 and essentially consists of the base 2 and the flat plate 3. The flat plate 3 has a flat front face 4 and a flat rear face 5. The stiffening columns 6, 7, which extend as far as the base plate 2, are fixed to the flat rear surface 5.

Two pairs of vertical guide rails 8, 9 are mounted on the front 4 of the plate 3. The guide rails 8, 9 of each pair are joined to one another and supported on the horizontal guide rails 10-13 such that they can be moved.

Figure 4:
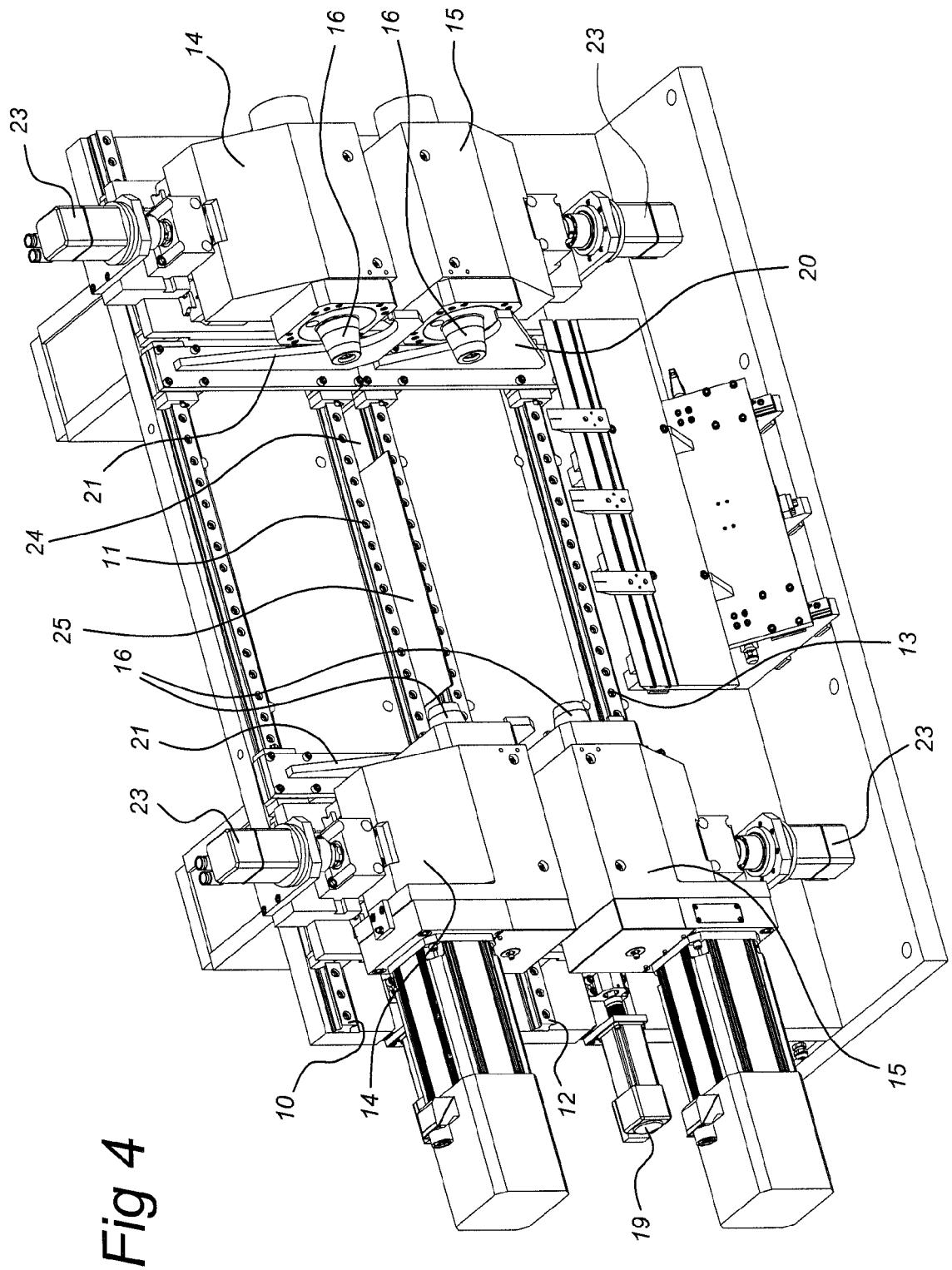
FIG. 4 shows a perspective view, corresponding to that in FIG. 1, without rollers.

Two heads 14, 15 are fitted on each pair of vertical guide rails. A stab axle 16 is rotatably supported in each of these heads. The stub axles 16 are of truncated cone shape, as can be seen in FIG. 4. The rollers 17, 18 are supported on, in each case, two stub axles 16 located opposite one another, as shown in FIG. 1.

In connection with installing and, respectively, removing the rollers, the heads 14, 15 are moved apart by moving the relevant pairs of guide rails 8, 9 apart using the linear actuators 19. As soon as they have been moved sufficiently far apart, it is possible to place the roller 18 in the supports 20 and the roller 17 in the supports 21. The heads 14, 15 can then be moved towards one another, such that the stub axles 16 of truncated cone shape fit into corresponding recesses in the rollers During this operation the latter are lifted from their respective supports 21, 20, after which a clamp fitting can be produced by means of fixing means known per se (not shown) between the rollers 17, 18 and the stub axles 16 of truncated cone shape.

The heads 14, 15 have electric motors for driving the stub axles 16 and thus the rollers 17, 18 in opposing directions. These motors are electronically synchronised and ensure that the rollers 17, 18 remain correctly positioned with respect to one another in the circumferential direction.

With the rotary installation according to the invention it is possible to adjust the pinch 22 between the rollers 17, 18. The distance between the heads 14 and 15 can also be adjusted depending on the diameter of the rollers. For this purpose the heads 14, 15 can be moved vertically towards one another and away from one another by means of the actuators 23.

Figure 3:
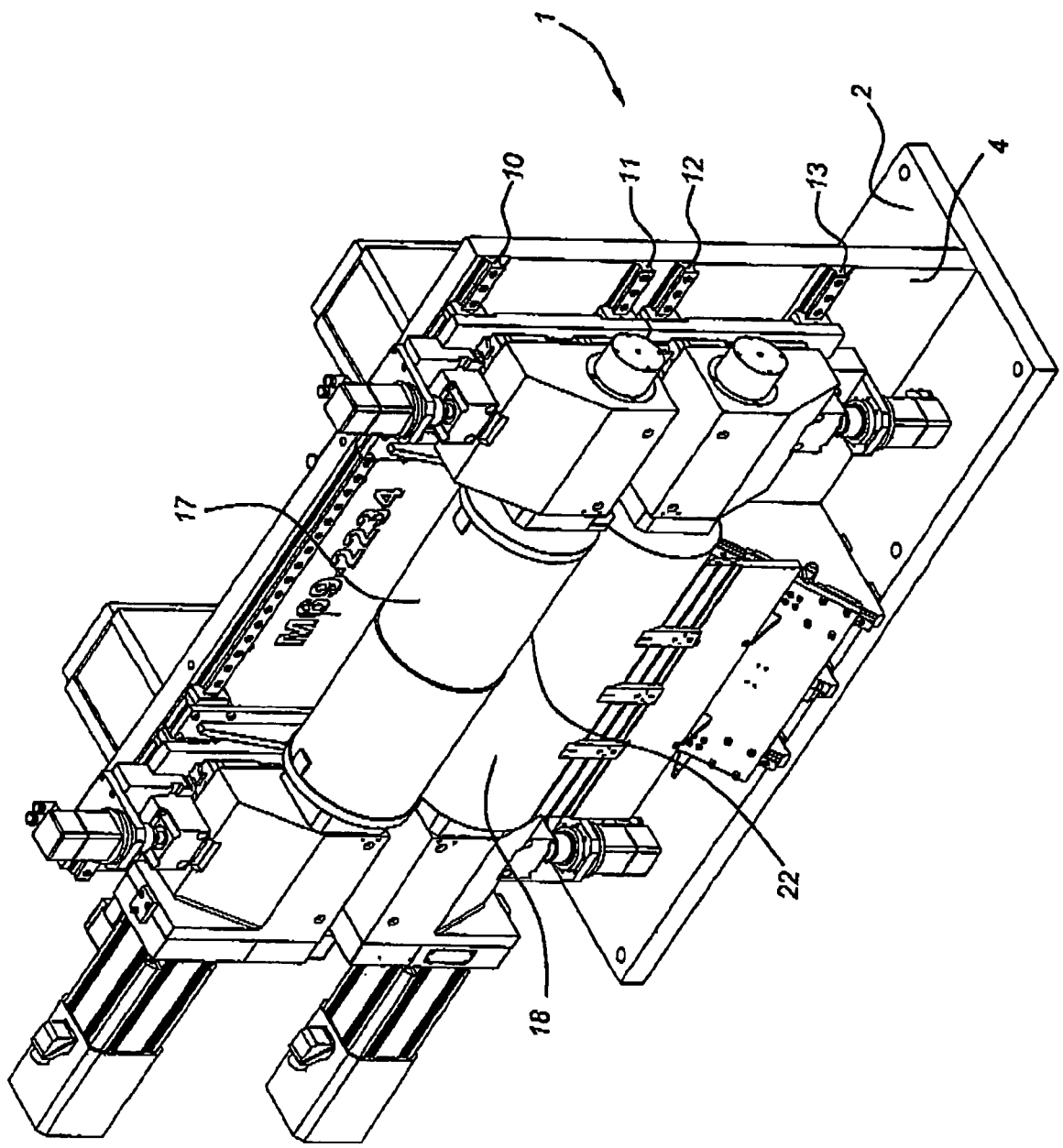
FIG. 3 shows a perspective view of the rear of the installation.

As can be seen in FIG. 3, a slit 24 has been made in the plate 4, such that the material to be machined can be fed via the slit 24 into the pinch 22 between the rollers 17, 18.

Figure 5:
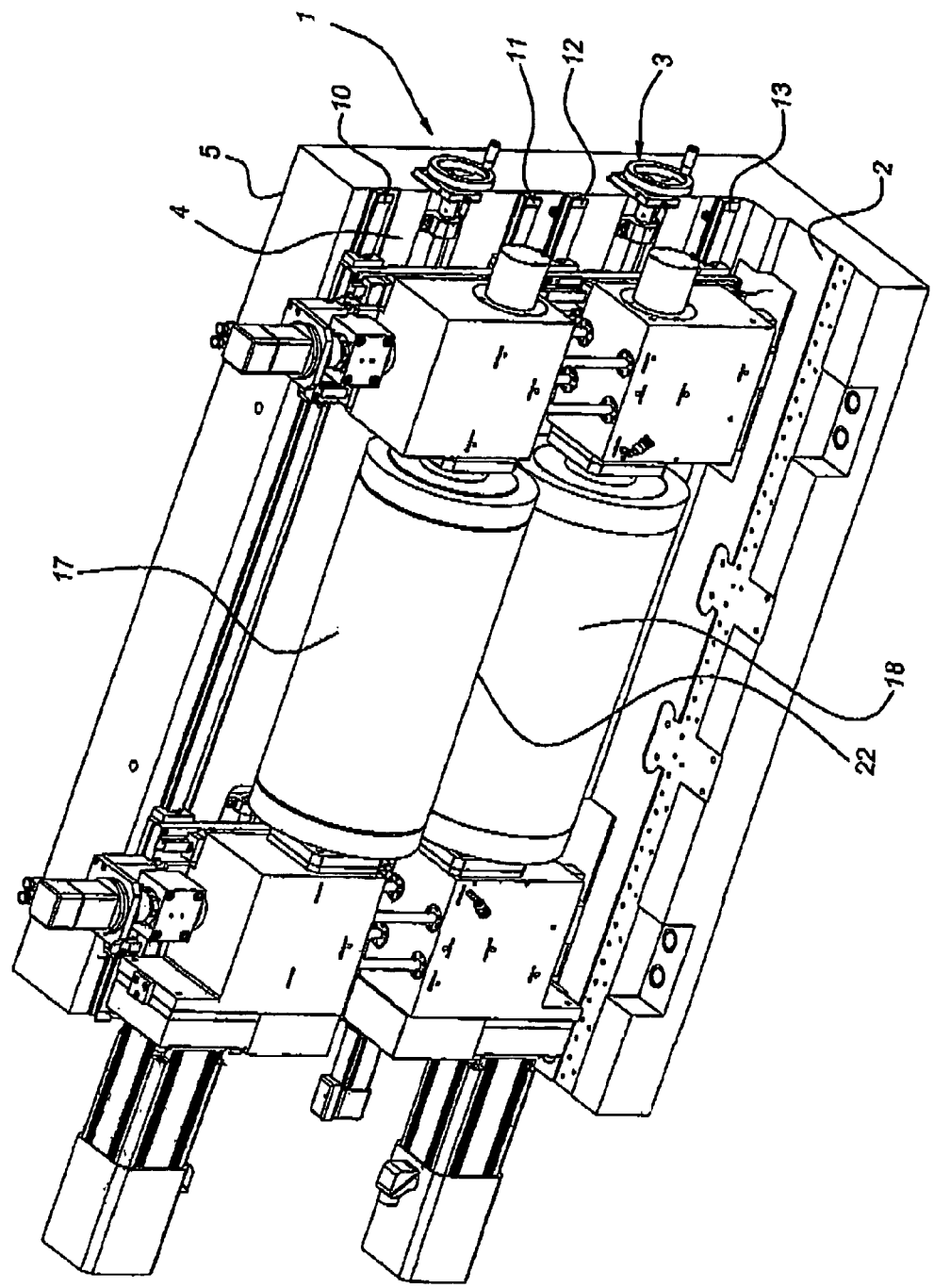
FIG. 5 shows a perspective view of a second embodiment of the installation according to the invention.

In broad terms the variant according to FIG. 5 corresponds to that in FIGS. 1-4. However, the base 2 and the flat plate 3 of the frame 1 are now made in one piece of, for example, concrete.

Figure 6:
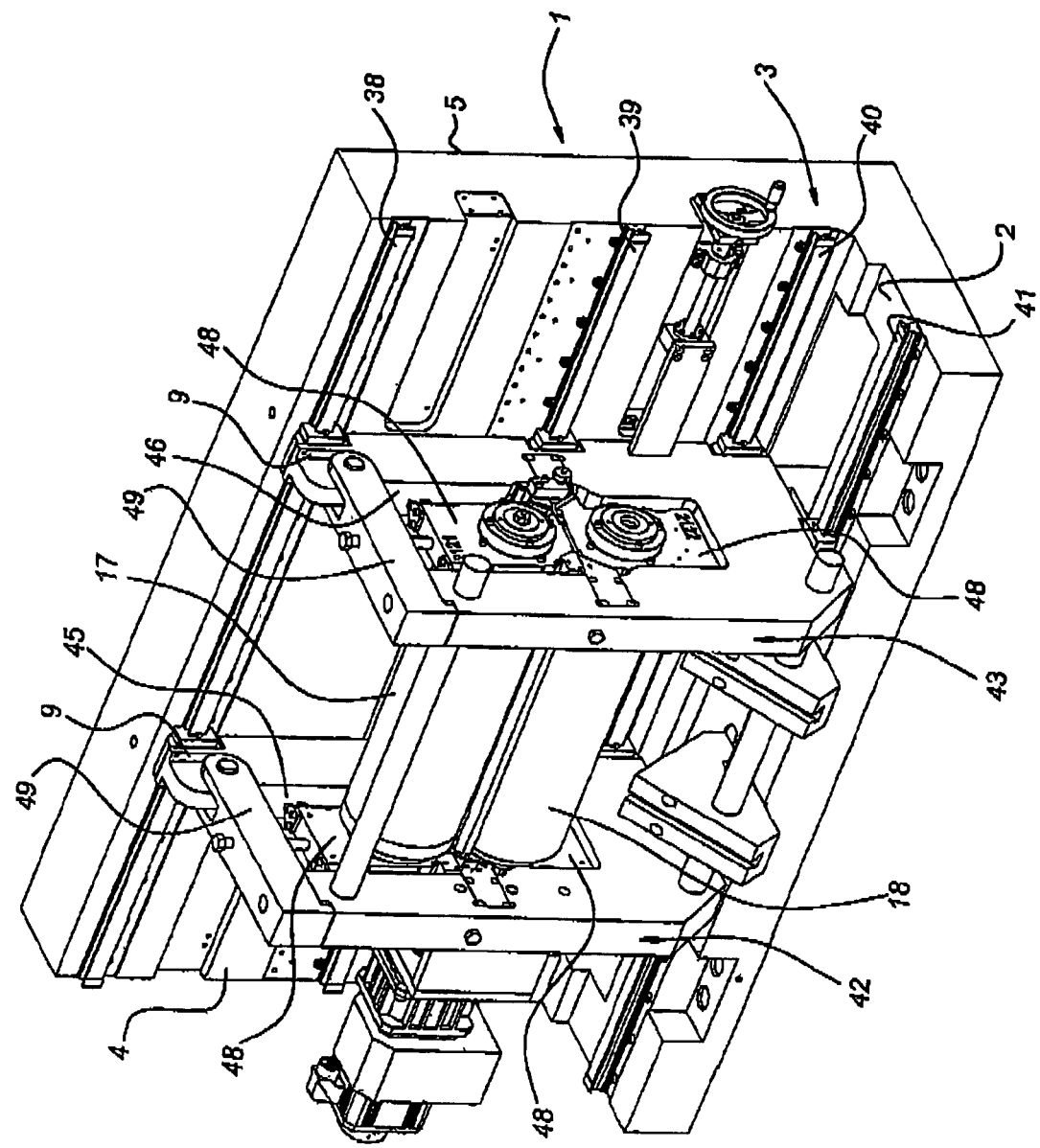
FIG. 6 shows a perspective view of a third embodiment of the installation.

The rotary installation shown in FIG. 6 likewise has a frame that is indicated in its entirety by 1 and essentially consists of a base 2 and a fat plate 3.

The flat plate 3 has a flat front face 4 and a rear face 5. The three horizontal guide rails 38, 39, 40 are mounted on the front 4 of the plate 3 and the horizontal guide rail 41 is mounted on the base 2. The uprights indicated in their entirety by 42 and 43 are supported on these rails 38-41.

These uprights 42, 43 can therefore be moved parallel to one another towards one another and away from one another. The stability of the uprights 42, 43 is guaranteed by the rigidity of the frame consisting of the base 2 and the fiat plate 3.

Each of the uprights 42, 43 has a slot 45 and 46, respectively. The bearing blocks indicated in their entirety by 48 are accommodated in these slots. The contour of these bearing blocks is such that they are slideably accommodated with a tight fit in the slots 45 and 46, respectively. The bearing blocks 47 can be removed from the slots 45, 46 by means of vertical displacement. After installing the bearing blocks 47, the slots 45, 46 are closed off at the top by the capping pieces 49.

The invention claimed is:

1. Apparatus for making at least one of a cut, crease or relief in a sheet of material, the apparatus comprising:
   a frame, said frame having a base and a flat plate forming a unified structure having a front vertical side and a rear vertical side that faces away from the front vertical side, said front vertical side and said rear vertical side extending from one side of the unified structure to the other;
   a pair of rollers, said pair of rollers defining a pinch opening between them, said pinch opening having a height relative from the base;
   a surface on at least one of the rollers having relatively high surface portions and relatively low surface portions for making the at least one of a cut, crease, or relief in the sheet of material when the sheet of material passes through the pinch opening;
   a plurality of mountings for supporting the rollers on the frame;
   a means for moving the mountings and the rollers with respect to the frame;
   a drive for making the rollers rotate;
   wherein the rollers and the mountings are located on the front vertical side of the flat plate;
   wherein the flat plate is parallel to the longitudinal axes of the rollers, said flat plate having a slit at the height of the pinch opening;
   said slit and said pinch opening each having a length dimension parallel to the longitudinal axes of the rollers and a width dimension perpendicular to said length dimension and oriented in vertical direction, said length dimension being larger than said width dimension; and
   wherein the width dimension of the slit is smaller than a height dimension of the pair of rollers so that material to be machined can be fed through said slit into the pinch opening between said rollers.

2. Apparatus according to claim 1, wherein a stiffener for the flat plate is located on the rear vertical side.

3. Apparatus according to claim 2, wherein the stiffener is columnar and extends transversely to a longitudinal direction of the rollers.

4. Apparatus according to claim 1, wherein the flat plate is essentially of parallelepiped shape.

5. Apparatus according to claim 4, wherein the flat plate is double-walled defining the front vertical side and the rear vertical side.

6. Apparatus according to claim 5, wherein the flat plate is hollow.

7. Apparatus according to claim 5, wherein the space between the doubled walls of the flat plate is filled with a filler.

8. Apparatus according to claim 7, wherein the filler is a hardened composite with densely packed particles.

9. Apparatus according to claim 8, wherein the filler has vibration-absorbing or vibration-damping properties.

10. Apparatus according to claim 4, wherein the flat plate is solid.

11. Apparatus according to claim 10, wherein the flat plate is made of a concrete.

12. Apparatus according to claim 1, wherein the frame has parallel vertical guides that support the plurality of mountings.

13. Apparatus according to claim 12, wherein ends of each of the rollers are mounted in a respective one of the mountings, the means for moving is linear actuators, and the linear actuators move respective ones of the mountings along a respective one of the vertical guides.

14. Apparatus according to claim 13, wherein each of the mountings has a rotary stub axle that detachably interacts with a respective one of the roller ends.

15. Apparatus according to claim 13, wherein each of the vertical guides has two pair of guide rails and two of the plurality of mountings are located one above the other on each of the pairs of guide rails.

16. Apparatus according to claim 1, wherein the flat plate has parallel horizontal guides that support the plurality of mountings.

17. Apparatus according to claim 16, wherein ends of each of the rollers are mounted in a respective one of the plurality of mountings and each of the mountings can be moved, via the means for moving, along a vertical guide, the vertical guides are supported by the horizontal guides.

18. Apparatus according to claim 17, wherein the horizontal guides comprise guide rails.

19. Apparatus according to claim 17, wherein the means for moving is linear actuators and the linear actuators move the vertical guides.

20. Apparatus according to claim 1, further comprising a pair of electric drive motors, wherein each of the rollers is connected to a respective one of the electric drive motors such that the rollers can be driven, the drive motors are connected to a control unit that synchronizes the drive motors.

21. Apparatus according to claim 1, wherein the base and the flat plate are made of concrete.

22. Apparatus according to claim 1, comprising a pair of uprights supported on the flat plate, the uprights supporting respective ones of the mountings, each of the mountings having a slot, bearing blocks provided on both ends of each of the rollers, and wherein each of the slots receives a respective one of the bearing blocks.

23. Apparatus according to claim 21, wherein the flat plat has parallel horizontal guides that support the uprights.

24. Apparatus according to claim 22, wherein the base of the frame has a guide track for supporting the uprights.

25. Apparatus according to claim 24, wherein the guide track on the base is below the uprights.

26. Apparatus according to claim 21, wherein each of the bearing blocks have an external contour that is slideably accommodated in a respective one of the slots with a tight fit.

27. Apparatus according to claim 21, wherein the bearing blocks are fixed bearing blocks.

28. Apparatus according to claim 21, wherein each of the bearing blocks have a stub axle that is accommodated in a respective recess in end faces of each of the rollers.

* * * * *